US011272014B2

(12) United States Patent
Paralikar

(10) Patent No.: US 11,272,014 B2
(45) Date of Patent: Mar. 8, 2022

(54) SYSTEMS AND METHODS FOR REDUCING CONNECTION SETUP LATENCY

(71) Applicant: Citrix Systems, Inc., Fort Lauderdale, FL (US)

(72) Inventor: Hrushikesh Shrinivas Paralikar, Milpitas, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/713,702

(22) Filed: Dec. 13, 2019

(65) Prior Publication Data

US 2021/0185130 A1 Jun. 17, 2021

(51) Int. Cl.
*H04L 29/08* (2006.01)
*H04L 67/141* (2022.01)
*H04L 49/90* (2022.01)
*H04L 67/56* (2022.01)

(52) U.S. Cl.
CPC ............ *H04L 67/141* (2013.01); *H04L 49/90* (2013.01); *H04L 67/28* (2013.01)

(58) Field of Classification Search
CPC ........ H04L 67/141; H04L 49/90; H04L 67/28
See application file for complete search history.

(56) References Cited

U.S. PATENT DOCUMENTS

| 2015/0019686 A1* | 1/2015 | Backholm | H04W 4/18 709/217 |
| 2015/0241941 A1* | 8/2015 | Luna | H04W 52/0219 713/320 |

* cited by examiner

Primary Examiner — Adnan M Mirza
(74) Attorney, Agent, or Firm — Foley & Lardner LLP

(57) ABSTRACT

Systems and methods for reducing latency in connection setup include a connector for connecting a server hosting a service to a network. The connector may establish a first connection between the connector and a first proxy of a first point of presence (PoP) of the network. The connector may receive, from the first proxy, a connection request to establish a second connection between the connector and a second proxy of a second PoP of the network associated with a plurality of clients. The first proxy may generate the connection request responsive to a first client of the plurality of clients requesting access to the service through the second proxy. The connector may establish the second connection between the connector and the second proxy, to facilitate exchange of traffic between the plurality of clients and the service across the network.

20 Claims, 8 Drawing Sheets

SYSTEMS AND METHODS FOR REDUCING CONNECTION SETUP LATENCY

FIELD OF THE DISCLOSURE

The present application generally relates to reducing connection setup latency, including but not limited to, systems and methods for reducing connection setup latency in a cloud-based network.

BACKGROUND

Various services may be used, accessed, or otherwise provided to users via their respective client devices. Where a client device attempts to connect to a service, the client device may experience latency in establishing the connection between the client and the service. Users of such client devices may have a decreased user experience caused by the increases in latency.

SUMMARY

This Summary is provided to introduce a selection of concepts in a simplified form that is further described below in the Detailed Description. This Summary is not intended to identify key features or essential features, nor is it intended to limit the scope of the claims included herewith.

Systems and methods for reducing connection setup latency are described herein. More particularly, the systems and methods described herein reduce latency for establishing connection between Points of Presence (PoPs) across a variety of geographic locations.

In a computing environment, services may be offered to various clients. Some services may be cloud-based services which are hosted on a server. To access such services, clients may establish (or request establishing) a connection between the client and the server hosting the service. A consideration or increasing user experience may be the time taken for establishing the connection between the client and server. For the client to access the service (e.g., via an application on the client or a browser of the client), the client and server may use or establish a transmission control protocol (TCP) connection between the client and server. Where the client and server exchange a significant amount of traffic, the client and/or server may establish a plurality of TCP connections for the client to access the service. Establishing multiple connections may increase the overall setup time, thus further decreasing user experience.

In some instances, the TCP connection(s) may be between a PoP corresponding to the client and a PoP corresponding to the server. Where the clients and server are separated by a geographic distances, the latency may further be increased, as clients may likely establish a connection with the PoP geographically closest thereto, and the server may establish a connection with the PoP geographically closest thereto. Such instances result in inter-PoP communications between several PoPs to determine the location of the server hosting the service, which further contributes to increases in latency and decreases to user experience.

The systems and methods described herein include a connector which facilitates cloud-based delivery of a service. The connector may establish an initial connection between the connector and a first proxy of a first PoP (e.g., a PoP which is closest to the connector). The connector may receive a connection request from the first proxy. The connection request may be a request to establish a second connection between the connector and a second proxy of a second PoP associated with a plurality of clients. The connector may receive the connection request responsive to a client requesting access to the service through the second proxy. The connector may establish the second connection between the connector and the second proxy such that the second connection facilitates traffic between the plurality of clients and the service. As such, subsequent clients may be capable of leveraging the second connection (which was already established responsive to the first client requesting access to the service through the second proxy) for connecting to the server.

The systems and methods described herein reduce setup time between the clients and server via various components of a cloud service. The connector establishes connections both with proxies associated with PoPs which are closest to the connector and PoPs which are being connected to by clients. Such implementations ensure that, when clients attempt to connect to the server hosting a particular service, a connection between the clients and server is already established (thus limiting setup delays). In other words, the systems and methods described herein "pre-establish" connections between the connector and proxies for various PoPs which are used for service traffic between clients and the server hosting the service. As such, where users are trying to connect to a server hosting a particular service, the connection setup happens without the overheads of inter POP communication and there are pre-established connections based on user traffic to avoid significant connection setup delays.

In one aspect, this disclosure is directed to a method. The method may include establishing, by a connector configured to connect a server hosting a service to a network, a first connection between the connector and a first proxy of a first point of presence (PoP) of the network. The method may include receiving, by the connector, from the first proxy, a connection request to establish a second connection between the connector and a second proxy of a second PoP of the network associated with a plurality of clients. The first proxy may be configured to generate the connection request responsive to a first client of the plurality of clients requesting access to the service through the second proxy. The method may include establishing, by the connector, the second connection between the connector and the second proxy, to facilitate exchange of traffic between the plurality of clients and the service across the network.

In some embodiments, the method further includes causing, by the connector, data corresponding to connections between the connector and a plurality of proxies including the first proxy and the second proxy to be stored in cache for the first proxy. In some embodiments, the method further includes detecting, by the connector, an event corresponding to the connector, and retrieving, by the connector from cache of the first proxy, the data corresponding to the connections, to re-establish the connections including the first connection and the second connection. In some embodiments, the method further includes selecting, by the connector from a plurality of proxies, the first proxy to establish the first connection based on a proximity between the connector and the first proxy.

In some embodiments, establishing the second connection includes establishing, by the connector, a plurality of second connections between the connector and the second proxy. At least one of the plurality of connections may be a buffering connection across which overflow traffic is exchanged between the plurality of clients and the service. In some embodiments, the method further includes receiving, by the connector from the second proxy, a buffer request to add one or more additional buffering connections between the second proxy and the connector based on an expected increase in traffic between the plurality of clients and the service. The method may further include establishing, by the connector, at least one buffering connection between the second proxy and the connector responsive to the buffer request. In some embodiments, the method further includes receiving, by the connector from the second proxy, a buffer request based on an expected decrease in traffic between the plurality of clients and the service. The method may further include removing, by the connector, the buffering connection between the second proxy and the connector, to manage bandwidth for the connector.

In some embodiments, the second proxy broadcasts a message to a plurality of proxies including the first proxy, to determine which of the plurality of proxies is connected to the connector corresponding to the service. Receiving the connection request may include receiving, by the connector, from the first proxy responsive to the first proxy receiving the message from the second proxy, the connection request to establish the second connection between the connector and the second proxy. In some embodiments, the first proxy is configured to update cache to include data corresponding to the second connection responsive to receiving the message from the second proxy. In some embodiments, the method further includes maintaining, by the connector, the second connection between the second proxy and the connector. The method may further include, responsive to the second proxy receiving a second request from a second client of the plurality of clients, exchanging, by the connector, data corresponding to the service between the second client and the service via the second connection. In some embodiments, the method further includes monitoring, by the connector, network traffic between the connector and at least one of the first proxy or the second proxy. The method may further include maintaining, by the connector, a number of connections between the connector and the at least one of the first proxy or the second proxy based on the monitored network traffic.

In another aspect, this disclosure is directed to a system. The system may include a connector executing on at least one processor and configured to connect a server hosting a service to a network. The connector may be configured to establish a first connection between the connector and a first proxy of a first point of presence (PoP) of the network. The connector may be configured to receive, from the first proxy, a connection request to establish a second connection between the connector and a second proxy of a second PoP of the network associated with a plurality of clients. The first proxy may be configured to generate the connection request responsive to a first client of the plurality of clients requesting access to the service through the second proxy. The connector may be configured to establish the second connection between the connector and the second proxy, to facilitate exchange of traffic between the plurality of clients and the service across the network.

In some embodiments, the connector is further configured to cause data corresponding to connections between the connector and a plurality of proxies including the first proxy and the second proxy to be stored in cache for the first proxy. In some embodiments, the connector is further configured to detect an event corresponding to the connector, and retrieve, from cache of the first proxy, the data corresponding to the connections, to re-establish the connections including the first connection and the second connection. In some embodiments, the connector is further configured to select, from a plurality of proxies, the first proxy to establish the first connection based on a proximity between the connector and the first proxy.

In some embodiments, the connector is configured to establish a plurality of second connections between the connector and the second proxy. At least one of the plurality of connections may be a buffering connection across which overflow traffic is exchanged between the plurality of clients and service. In some embodiments, the connector is configured to receive, from the second proxy, a buffer request to add one or more additional buffering connections between the second proxy and the connector based on an expected increase in traffic between the plurality of clients and the service. The connector may be configured to establish at least one buffering connection between the second proxy and the connector responsive to the buffer request. In some embodiments, the connector is configured to receive, from the second proxy, a buffer request based on an expected decrease in traffic between the plurality of clients and the service. The connector may be configured to remove the buffering connection between the second proxy and the connector, to manage bandwidth for the connector.

In some embodiments, the second proxy broadcasts a message to a plurality of proxies including the first proxy, to determine which of the plurality of proxies is connected to the connector corresponding to the service. The connector may be configured to receive, from the first proxy responsive to the first proxy receiving the message from the second proxy, the connection request to establish the second connection between the connector and the second proxy. In some embodiments, the connector is further configured to maintain the second connection between the second proxy and the connector. The connector may be configured to, responsive to the second proxy receiving a second request from a second client of the plurality of clients, exchange data corresponding to the service between the second client and the service via the second connection.

In another aspect, this disclosure is directed to a non-transitory computer readable medium storing program instructions for causing one or more processors to establish a first connection between a connector and a first proxy of a first point of presence (PoP) of a network. The connector may be configured to connect a server hosting a service to the network. The instructions may cause the one or more processors to receive, from the first proxy, a connection request to establish a second connection between the connector and a second proxy of a second PoP of the network associated with a plurality of clients. The first proxy may be configured to generate the connection request responsive to a first client of the plurality of clients requesting access to the service through the second proxy. The instructions may cause the one or more processors to establish the second connection between the connector and the second proxy, to facilitate exchange of traffic between the plurality of clients and the service across the network.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals, identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles, and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for providing a clustered appliance architecture environment;

Section D describes embodiments of systems and methods for providing a clustered appliance architecture environment; and Section E describes embodiments of systems and methods for reducing connection setup latency.

A. Network and Computing Environment

Figure 1A:
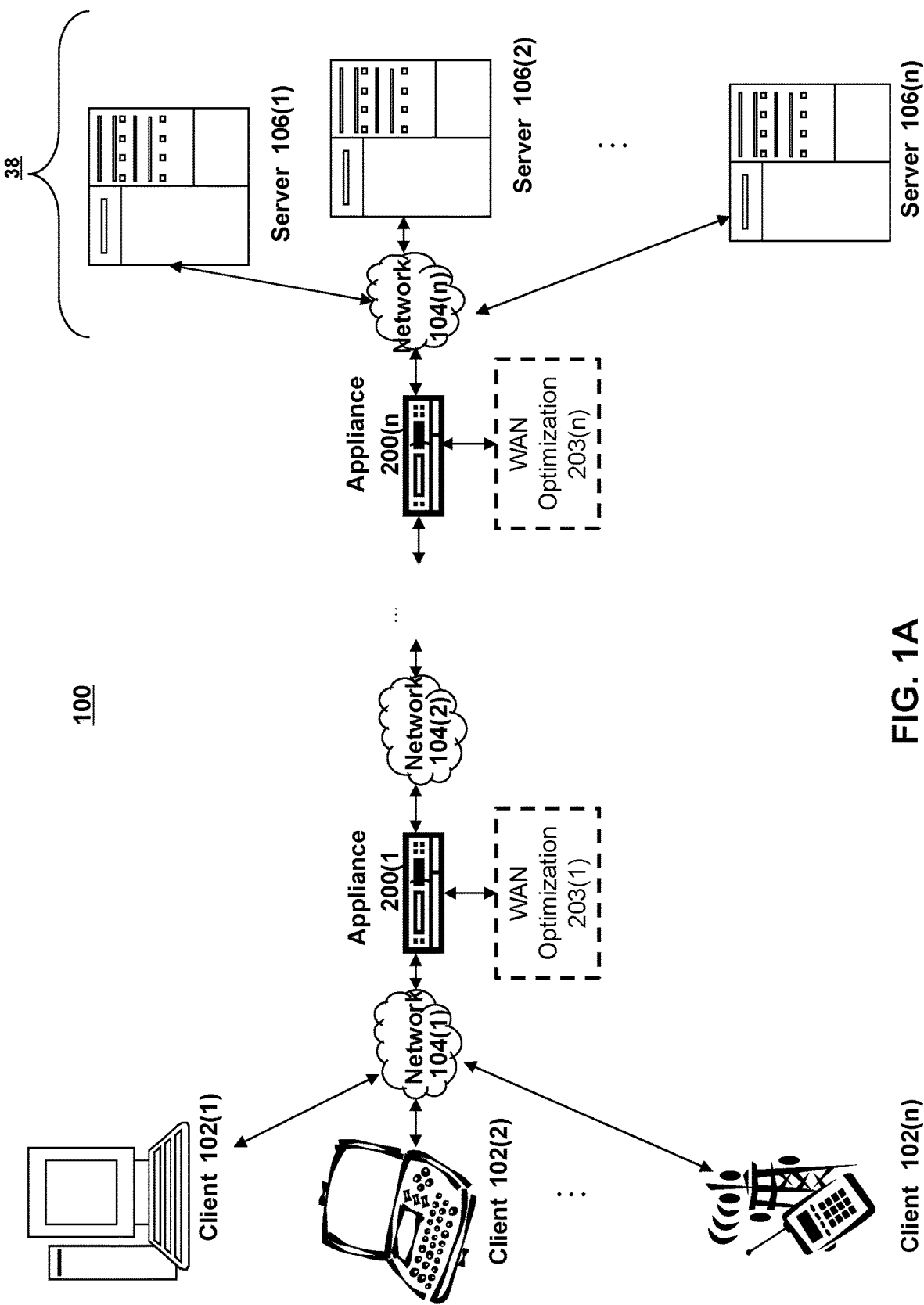
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 203(1)-203(n), referred to generally as WAN optimization appliance(s) 203. For example, WAN optimization appliance 203 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 203 may be a performance enhancing proxy or a WAN optimization controller. In one embodiment, appliance 203 may be implemented as Citrix SD-WAN products sold by Citrix Systems, Inc. of Fort Lauderdale, Fla.

Figure 1B:
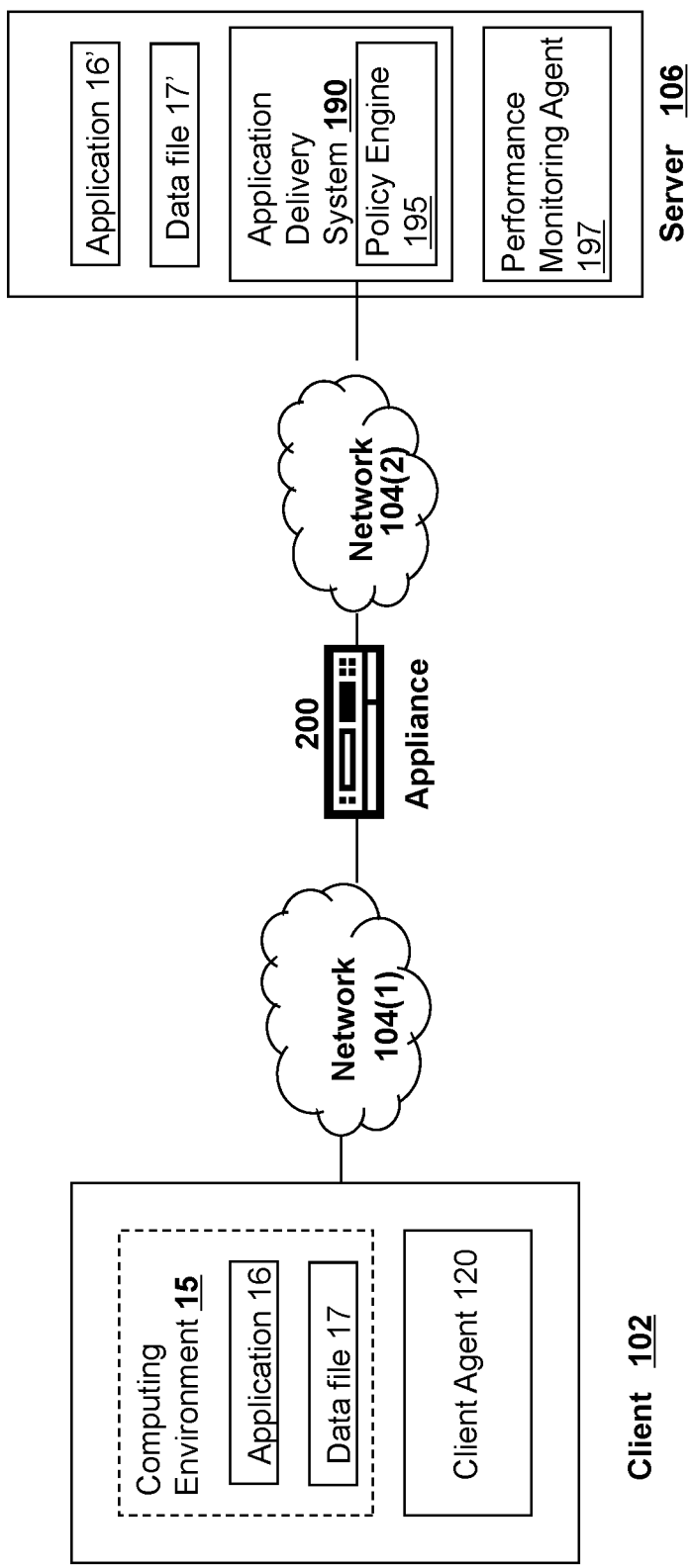
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 102 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 203, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 203 may be deployed as and/or executed on any type and form of computing device, such as any desktop computer, laptop computer, or mobile device capable of communication over at least one network and performing the operations described herein. For example, clients 102, servers 106 and/or appliances 200 and 203 may each correspond to one computer, a plurality of computers, or a network of distributed computers such as computer 101 shown in FIG. 1C.

Figure 1C:
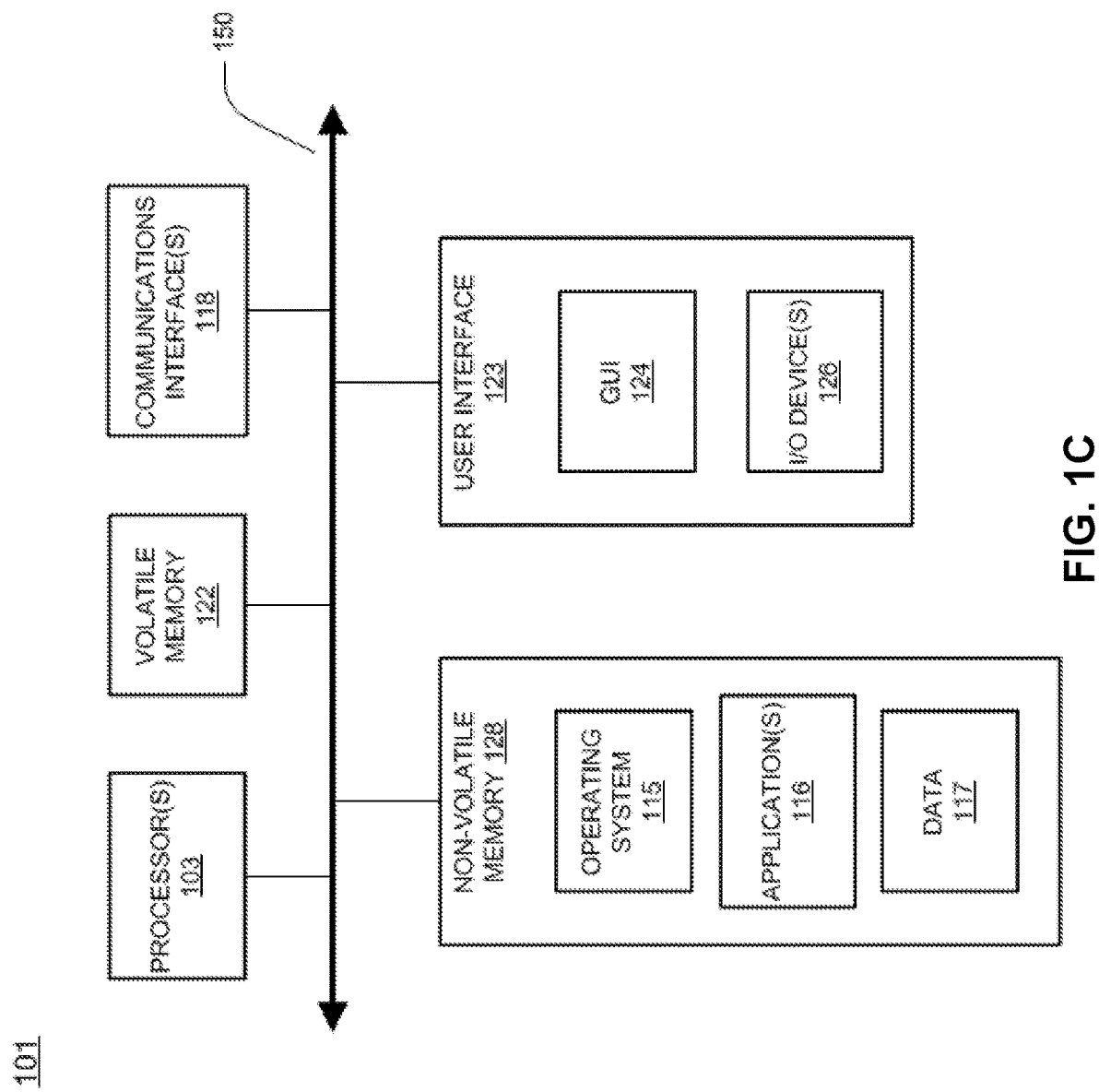
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 203 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computer 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
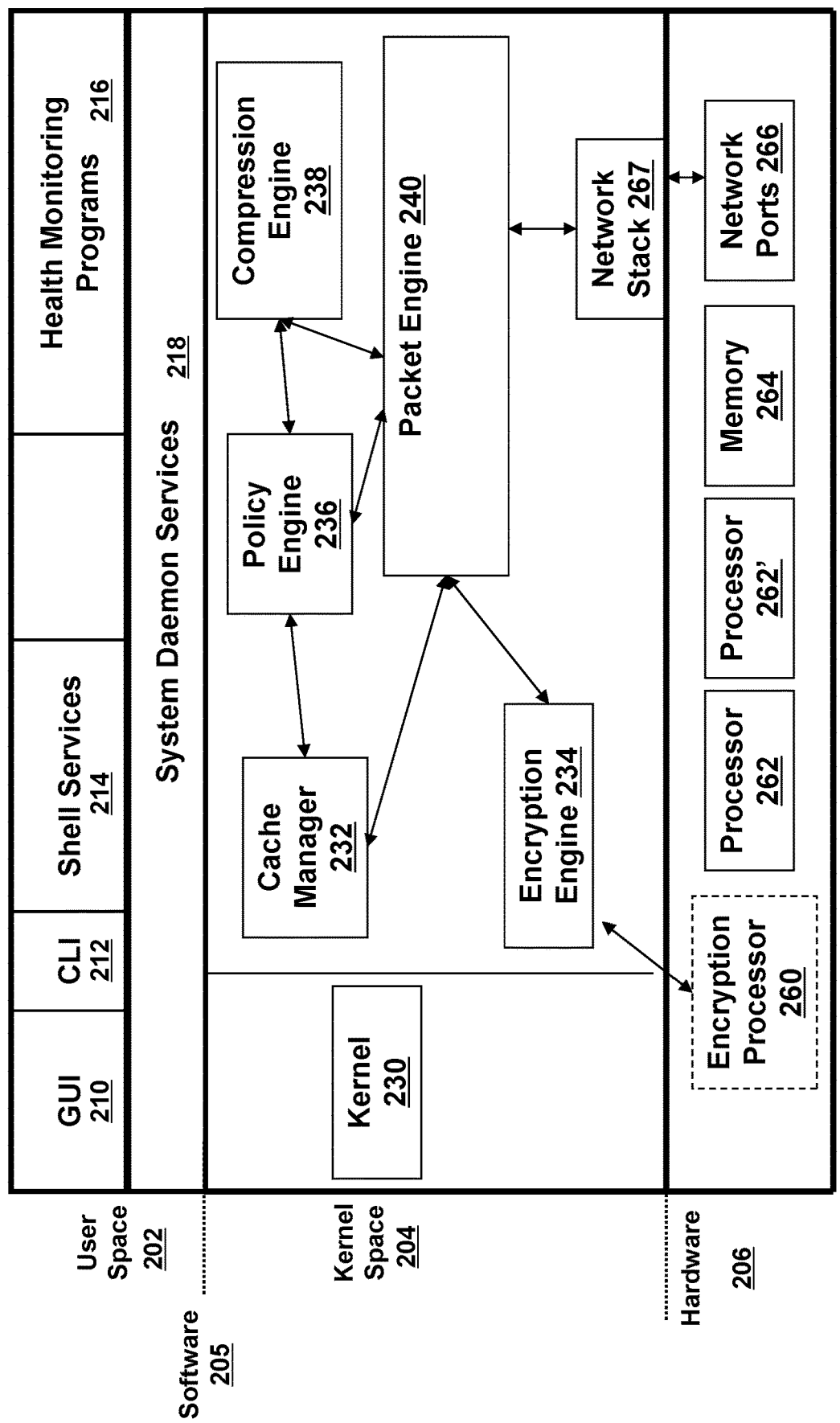
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of appliance 200 or 203. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 203. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 203. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Virtualizing an Application Delivery Controller

Figure 3:
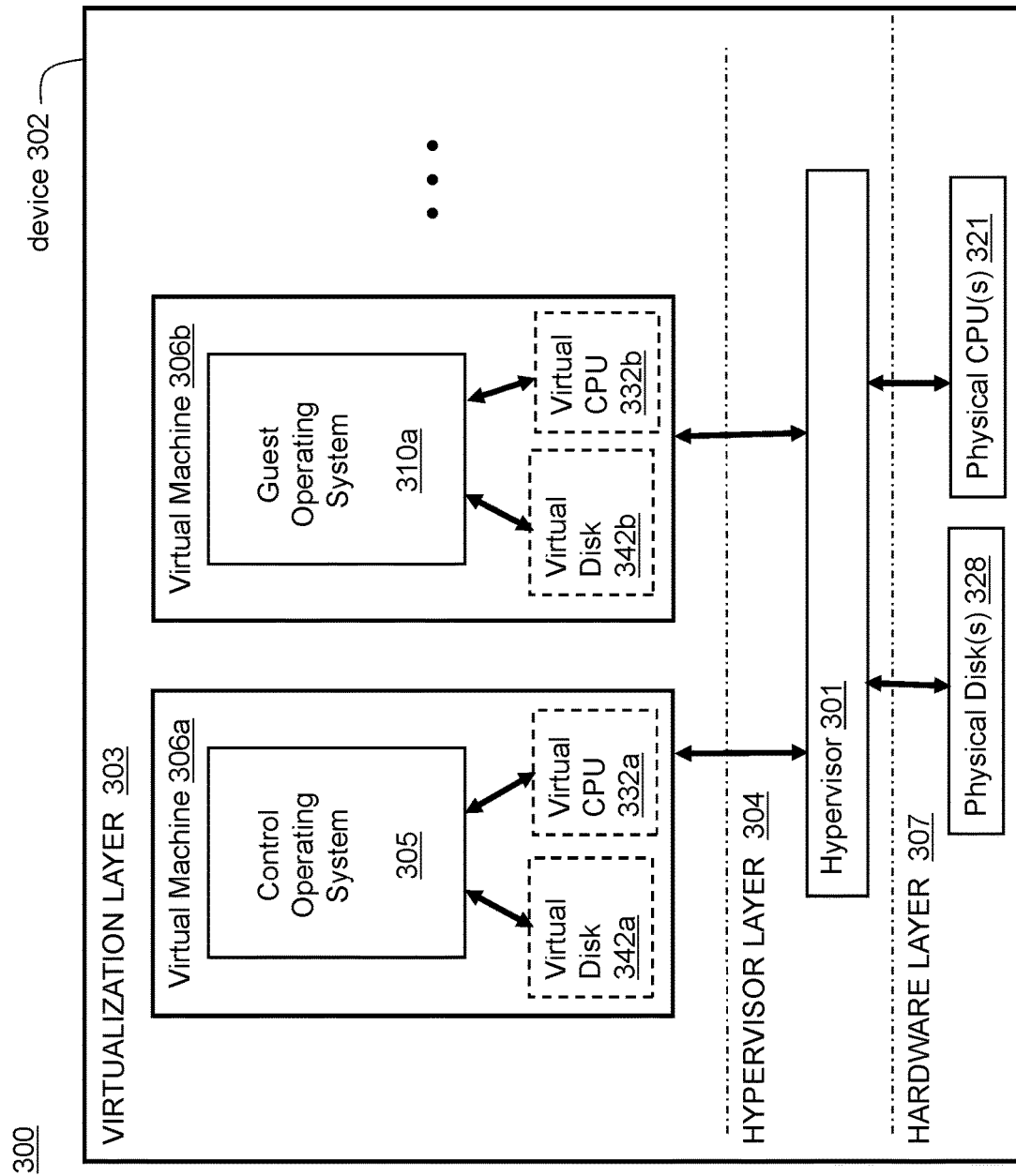
FIG. 3 is a block diagram of a virtualization environment, in accordance with an illustrative embodiment.

Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
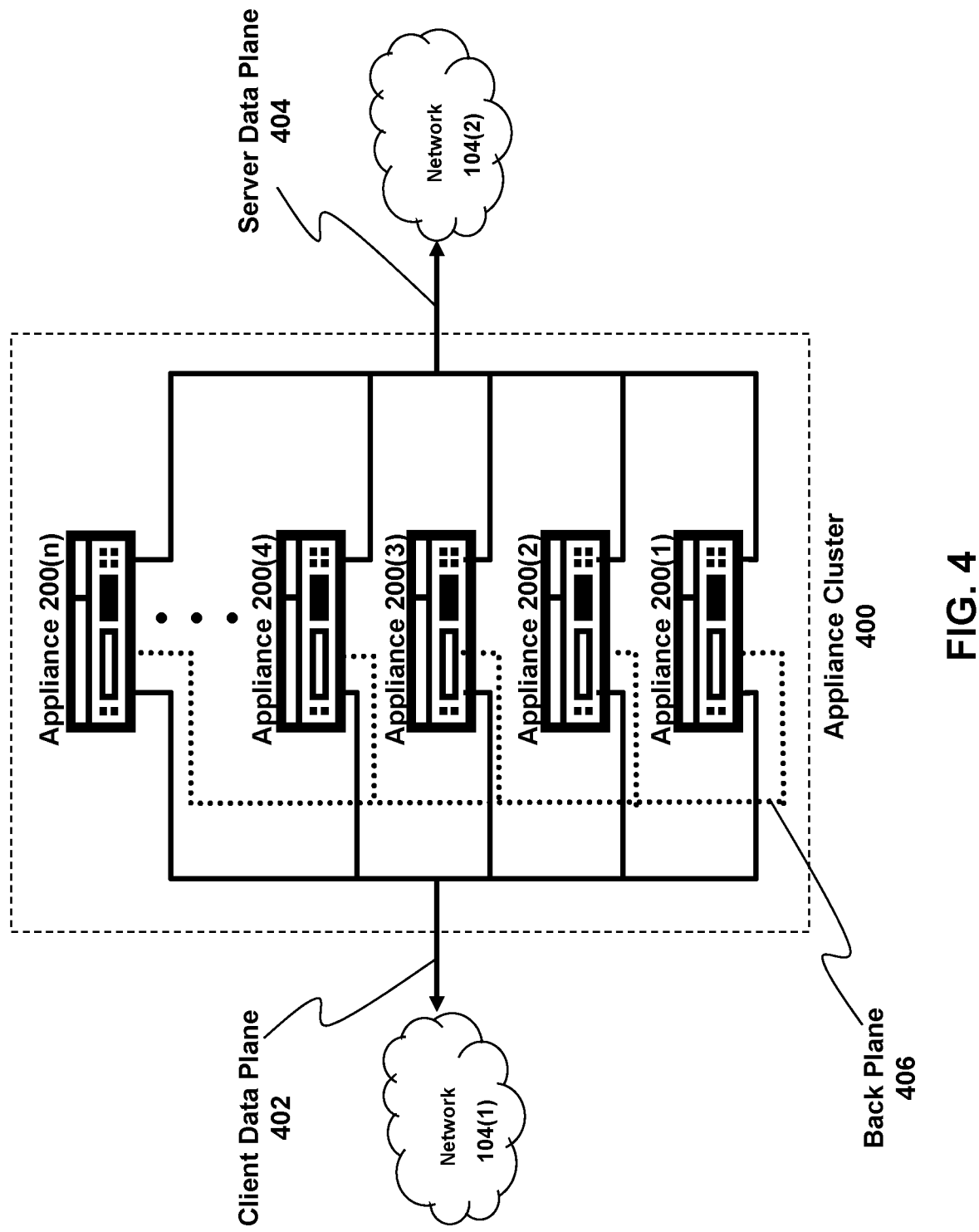
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

E. Systems and Methods for Reducing Connection Setup Latency

Systems and methods for reducing connection setup latency are described herein. More particularly, the systems and methods described herein reduce latency for establishing connection between Points of Presence (PoPs) across a variety of geographic locations.

In a computing environment, services may be offered to various clients. Some services may be cloud-based services which are hosted on a server. To access such services, clients may establish (or request establishing) a connection between the client and the server hosting the service. A consideration for increasing user experience may be the time taken for establishing the connection between the client and server. For the client to access the service (e.g., via an application on the client or a browser of the client), the client and server may use or establish a transmission control protocol (TCP) connection between the client and server. Where the client and server exchange a significant amount of traffic, the client and/or server may establish a plurality of TCP connections for the client to access the service. Establishing multiple connections may increase the overall setup time, thus further decreasing user experience.

In some instances, the TCP connection(s) may be between a PoP corresponding to the client and a PoP corresponding to the server. Where the clients and server are separated by a geographic distances, the latency may further be increased, as clients may likely establish a connection with the PoP geographically closest thereto, and the server may establish a connection with the PoP geographically closest thereto. Such instances result in inter-PoP communications between several PoPs to determine the location of the server hosting the service, which further contributes to increases in latency and decreases to user experience.

The systems and methods described herein include a connector which facilitates cloud-based delivery of a service. The connector may establish an initial connection between the connector and a first proxy of a first PoP (e.g., a PoP which is closest to the connector). The connector may receive a connection request from the first proxy. The connection request may be a request to establish a second connection between the connector and a second proxy associated with a plurality of clients. The connector may receive the connection request responsive to a client requesting access to the service through the second proxy. The connector may establish the second connection between the connector and the second proxy such that the second connection facilitates traffic between the plurality of clients and the service. As such, subsequent clients may be capable of leveraging the second connection (which was already established responsive to the first client requesting access to the service through the second proxy) for connecting to the server.

The systems and methods described herein reduce setup time between the clients and server via various components of a cloud service. The connector establishes connections both with proxies associated with PoPs which are closest to the connector and PoPs which are being connected to by clients. Such implementations ensure that, when clients attempt to connect to the server hosting a particular service, a connection between the clients and server is already established (thus limiting setup delays). In other words, the systems and methods described herein "pre-establish" connections between the connector and proxies for various PoPs which are used for service traffic between clients and the server hosting the service. As such, where users are trying to connect to a server hosting a particular service, the connection setup happens without the overheads of inter POP communication and there are pre-established connections based on user traffic to avoid significant connection setup delays.

Figure 5:
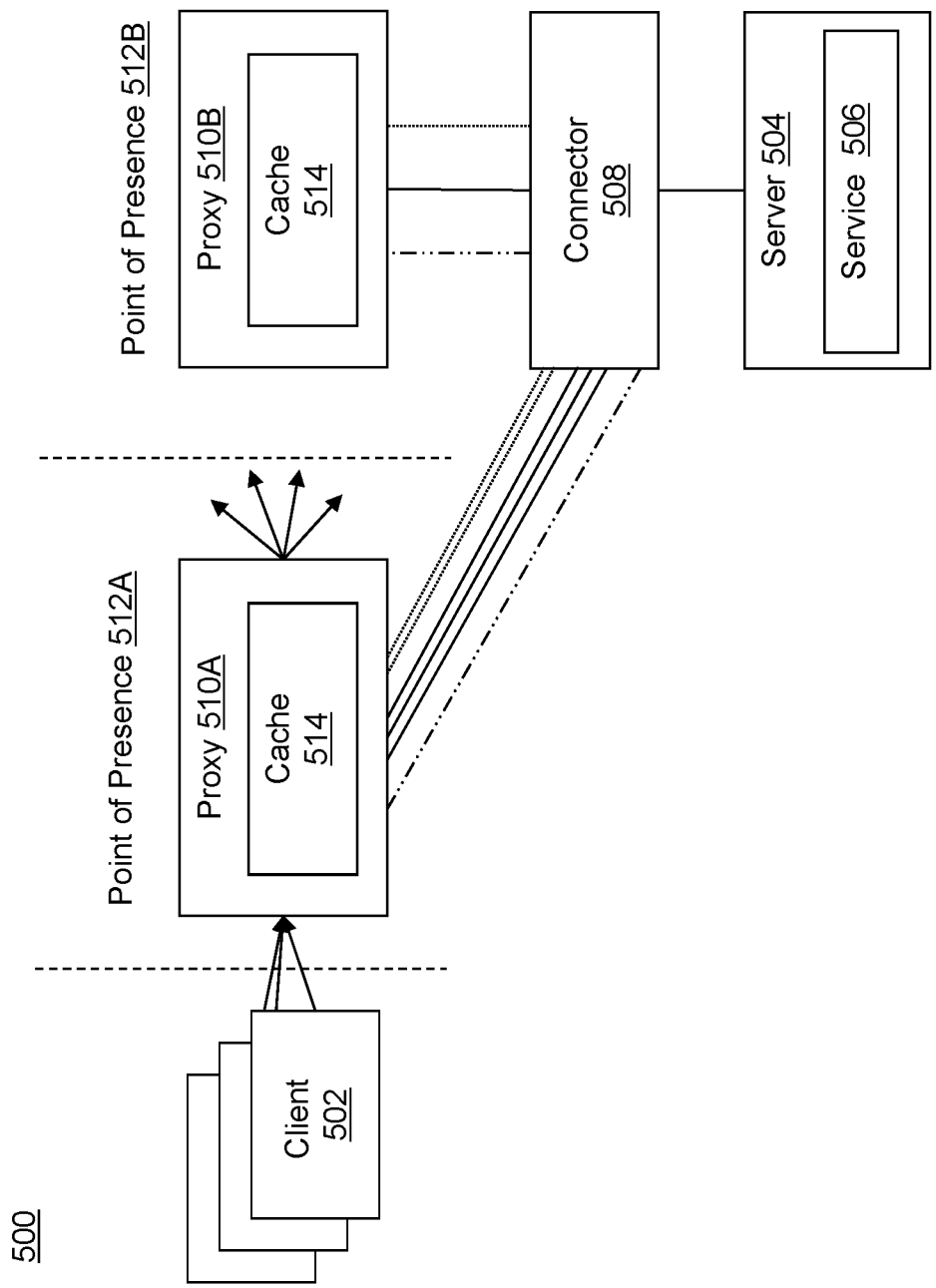
FIG. 5 is a block diagram of a system for facilitating communications between clients and a service, in accordance with an illustrative embodiment.

Referring now to FIG. 5, depicted is a block diagram of a system 500 for facilitating communications between clients and a service, according to an illustrative embodiment. The system 500 is shown to include a plurality of clients 502 and a server 504 hosting a service 506. A connector 508 corresponding to the server 504 may facilitate cloud-based transmission of data corresponding to the service 506. The system 500 may include a proxy 510A associated with the clients 502 and a proxy 510B associated with the connector 508. The clients 502 may connect to the proxy 510A based on the proxy 510A being located at a point of presence (PoP) 512A which is closest to the clients 502, and the connector 508 may connect to the proxy 510B based on the proxy 510B being located at a PoP 512B which is closest to the connector 508. The connector 508 may be configured to receive connection requests from the proxy 510B. For instance, the connector 508 may be configured to receive a connection request from the proxy 510B to establish a connection with the proxy 510A. The proxy 510B may generate the connection request for the connector 508 responsive to the proxy 510A receiving a request from a client 502 to access the service 506 (and determining that the proxy 510A does not have a connection to the connector 508 corresponding to the service 506). The connector 508 may be configured to establish a connection between the proxy 510A and connector 508 to facilitate exchange of traffic between the plurality of clients 502A (e.g., connected to the proxy 510A) and the service 506.

The systems and methods of the present solution may be implemented in any type and form of device, including clients, servers and/or appliances described above with reference to FIG. 1A-FIG. 4. For instance, the connector 508 and proxies 510A, 510B may be implemented as, embodied on, or otherwise incorporated into an appliance 200 described above with reference to FIG. 2-FIG. 4. The clients 502 may be similar in some respects to the clients 102 described above with respect to FIG. 1A-FIG. 1B. The server 504 (e.g., hosting the service 506) may be similar in some respects to the server 106 described above with respect to FIG. 1A-FIG. 1B. In other words, the connector 508, proxies 510A, 510B, clients 502, and/or server 504 may include or incorporate components and devices similar in some aspects to those described above with reference to FIG. 1C, such as a memory and/or one or more processors operatively coupled to the memory. The present systems and methods may be implemented in any embodiments or aspects of the appliances or devices described herein.

As shown in FIG. 5, the system 500 may include a plurality of clients 502. The clients 502 may be similar in some respects to the clients 102 described above. The clients 502 be personal computers, laptops, desktops, tablets, mobile devices, etc. The clients 502 may be configured to access various services, some of which may be cloud-based services. For instance, the clients 502 may be configured to access a service 506 hosted on a server 504. The server 504 may be located remotely from the clients 502. The server 504 may include, maintain, or otherwise host one or more services 506. The services 506 may be various types or forms of software, data, applications, or other types or forms of services which may be provided to the clients 502. In some embodiments, the service(s) 506 may be or include remote applications, software as a service (SaaS) applications, etc. The service(s) 506 may enterprise specific (e.g., services which are specific to a single enterprise, developed by the enterprise, etc.), may be accessible by a plurality of different enterprises, etc. The clients 502 may be configured to access the service(s) 506 via an application at the client 502, via a browser of the client 502, etc.

The system 500 may include a connector 508. The connector 508 may be arranged intermediary to the server 504 hosting the service 506 and the clients 502. The connector 508 may be a server-side device which facilitates transmission, receipt, or other exchange of data between the server 504 and the clients 502. The connector 508 may act as a proxy between the server 506 hosting the service 506 and various PoPs 512 (particularly where the server 504 is firewall protected). The connector 508 may be an appliance similar in some respects to the appliances 200 described above. The connector 508 may be configured to generate, build, construct, or otherwise establish connections between the connector 508 and one or more proxies 510. As described in greater detail below, the connector 508 and proxies 510 may together provide a cloud-based network upon which traffic corresponding to the service 506 may be exchanged between the clients 502 and server 504. Hence, the connector 508 may connect the server 504 hosting the service 506 to the network formed by the proxies 510.

The system 500 is shown to include a plurality of proxies 510. The plurality of proxies 510 may together form a network across which data, packets, content, and so forth is exchanged between various end points. The network may be a cloud-based network. At least one of the proxies 510 may be a client-side proxy (e.g., located at a point of presence (PoP) 512A of the network corresponding to the clients 502), and another proxy 510 may be a server-side proxy (e.g., located at a PoP 512B corresponding to the server 504). While shown as two proxies 510, it is noted that the system 500 may include any number of proxies 510 located at various geographical locations throughout the country and in various other countries/locations. Further, in some implementations, a PoP 512 may include a plurality of proxies 510. In some embodiments, the proxy 510A and proxy 510B may be located at the same PoP 512 (e.g., with proxy 510A associated with a plurality of clients 502, and proxy 510B associated with the connector 508). Hence, the present disclosure is not limited to the arrangements depicted in FIG. 5. Each proxy 510 may facilitate communication, exchange, transmission, and/or receipt of data across a cloud-based network established, formed, or otherwise corresponding to the proxies 510. The connectors 508 may connect servers 504 hosting services 506 to the network such that data corresponding to the services 506 (e.g., an endpoint) can be provided to clients 502 (e.g., another endpoint).

The proxies 510 may be located at a respective PoP 512, with each PoP 512 corresponding to a geographic location which is serviced by a respective proxy 510. Each proxy 510 may be connected to other proxies 510. Together, the proxies 510 may form a network in which proxies 510 are configured to communicate with other proxies 510. The proxies 510 may form a cloud-based network in which content from servers (such as content corresponding to the service 506 hosted on the server 504) can be exchanged, transmitted, received, or otherwise provided to clients 502.

The connector 508 may be configured to generate, form, build, construct, or otherwise establish a connection between the connector 508 and a server-side proxy 510B (e.g., of a server-side PoP 512B). The connector 508 may be configured to establish the connection with the proxy 510B based on the proxy 510B being located closest to the connector 508. Hence, the connector 508 may be configured to select a proxy 510 for which to establish a connection (e.g., from a plurality of proxies 510 of the network) based on a proximity between the connector 508 and the proxy 510. In some embodiments, the connector 508 may be configured to generate a ping which is broadcasted into the network of proxies 510. Each proxy 510, upon receiving the ping, may generate and transmit a response for the connector 508. The connector 508 may be configured to determine which proxy 510 is closest to the connector 508 based on a response time for the response from the proxies 510 (e.g., the response time which is shortest coincides with the proxy 510 which is in closest proximity to the connector 508).

Similarly, the clients 502 may be configured to register or otherwise form a connection with a respective proxy 510A (e.g., client-side proxies 510). In some embodiments, the clients 502 may be configured to determine which of the plurality of proxies 510 to register with based on a respective location of the proxies 510 to the clients 502. For instance, the clients 502 may be configured to generate and transmit a ping to each of the proxies 510. The proxies 510 may be configured to receive the ping and send a response back to the client 502. The clients 502 may be configured to receive the response from the proxies 510 and determine which proxy 510 is closest to the clients 502 based on a response time for the responses from the proxies 510 (e.g., a difference between a timestamp of the ping and a timestamp of the response, a difference between the timestamp of the ping and a timestamp at a time in which the response is received, etc.). The clients 502 may be configured to register with proxies 510 which are geographically closest thereto. In other words, the clients 502 may be configured to register with proxies 510 which service a PoP 512 which is associated with the clients 502.

The connector 508 and clients 502 may be configured to generate, form, create, or otherwise establish a plurality of connections to a respective proxy 510. In some embodiments, the connections may include control connections (shown in dot-dot-dash), data connections (shown in solid), and buffering connections (shown in dot). The control connections may be used for exchanging data between the proxies 510 and connector 508, and between the clients 502 and proxies 510. The data connections may be used for passing data between the client 502 and server 504 hosting the service 506. In other words, the data connections may be used for transmitting application (e.g., service 506) related data, whereas the control connections may be used for transmitting control data for the cloud-based network. As described in greater detail below, the buffering connections may be used for managing overflow network traffic.

Each proxy 510 may be configured to store data corresponding to its connections. For instance, in the example shown in FIG. 5, the first proxy 510A may store data corresponding to connections (e.g., connection data) between the clients 502 and the connector 508, and the second proxy 510B may store connection data with the connector 508. The proxies 510 may be configured to store connection data locally (e.g., in cache 514). Proxies 510 may be connected to both clients 502 and connectors 508. Some clients 502 may be connected to a proxy 510 which is connected to a connector corresponding to a desired service. For instance, some clients 502 may be connected to the proxy 510B, which is also connected to the connector 508. Such clients 502 may be connected to the proxy 510B because those clients 502 are in closer proximity to proxy 510B than to proxy 510A. Such clients 502 may be configured to access the service 506 corresponding to the connector 508 via the connections between the client 502 and proxy 510B, the proxy 510B and connector 508, and the connector 508 and server 504 hosting the service 506. Hence, where a client 502 is connected to a proxy 510 which is also connected to a connector corresponding to a desired service, those clients 502 may already have an end-to-end connection between the client 502 and server hosting the service.

In some instances, some clients 502 may connected to a proxy 510 which is not connected to a connector corresponding to a desired service. For instance, a client 502 may be configured to generate a request to access a service 506. The request may include, for instance, an identifier corresponding to the service 506, an address of the server 504 hosting the service 506, an identifier of the connector 508 corresponding to the service 506, etc. The client 502 may be configured to generate the request responsive to a user of the client 502 selecting an icon on a user interface of the client 502 corresponding to the service 506, responsive to the user providing a uniform resource locator (URL) address corresponding to the service 506 in a browser of the client 502, etc. The client 502 may be configured to transmit the request to the proxy 510A with which the client 502 is connected (e.g., the client-side proxy 510A, or the proxy 510A associated with a PoP 512A closest to the client 502). The client 502 may be configured to transmit the request via an address for the proxy 510A, via a connection established between the proxy 510A and client 502, etc.

The proxy 510A may be configured to receive the request from the clients 502. The proxy 510A may be configured to receive requests from those clients 502 which are geographically located closest thereto. Hence, as a network adds additional proxies 510, requests to access services may be routed to and received by different proxies 510 based on which proxies 510 are closest to the client 502 initiating the request for the service 506. In the example shown in FIG. 5, the proxy 510A may receive the request from the clients 502 (as opposed to the proxy 510B), since the proxy 510A is in closer proximity to the clients 502 than proxy 510B. The proxy 510A may be configured to analyze, inspect, process, or otherwise parse the request to determine whether the proxy 510A is connected to the connector 508 corresponding to the requested service 506. In some embodiments, the proxy 510A may be configured to parse the request from the client 502 to identify the identifier corresponding to the service 506, the address of the server 504 hosting the service 506, the identifier of the connector 508 corresponding to the service 504, etc. The proxy 510A may be configured to cross-reference the data identified in, extracted from, or otherwise corresponding to the request from the client 502 with data in cache 514 to determine whether the proxy 510A is connected to the connector 508. The proxy 510A may be configured to determine whether or not the proxy 510A shares a connection with the connector 508 corresponding to the service 506. As described above, the proxy 510A may not initially share a connection with the connector 508 if another proxy 510 (e.g., proxy 510B) is located in closer proximity to the connector 508 than the proxy 510A (as the connector 508 may automatically establish a connection with the proxy 510 which is closest to the connector 508, or proxy 510B in the example shown in FIG. 5). Where the proxy 510A determines that there is not a connection with the connector 508, the proxy 510A may be configured to cause a connection to be established and maintained between the proxy 510A and connector 508 for subsequent requests from clients 502 to access the service 506, as described in greater detail below.

The proxy 510A may be configured to build, form, create, construct, or otherwise generate a message for one or more other proxies 510 of the network (so that the user request for the service 506 may be proxied by the appropriate proxies 510). The message may include data corresponding to the request. For instance, the message may include an identifier of the proxy 510A, an identifier of the connector 508 (or the server 504, the service 506, etc.), a request to establish a connection between the proxy 510A and the connector 508, a number of data connections which are to be established between the proxy 510A and the connector 508, a bandwidth of the connection between the proxy 510A and the connector 508, etc. The proxy 510A may be configured to generate, transmit, send, provide, or otherwise broadcast the message to one or more other proxies 510. In some embodiments, the proxy 510A may broadcast the message to each of the proxies 510 in the network. In some embodiments, the proxy 510A may broadcast the message to another proxy 510 (which does not share a connection with the connector 508), and that proxy 510 may broadcast a corresponding message to another proxy 510, and so forth until the proxy 510B which shares a connection with the connector 508 receives the message. In some embodiments, the proxy 510A may broadcast the message to a targeted proxy 510 (e.g., proxy 510B). The proxy 510A may be configured to perform a global lookup to identify the proxy 510B which is connected to the connector 508. For instance, the proxy 510A may be configured to access a database or data structure which stores a ledger of proxies 510 and corresponding connectors 508 which are connected thereto. The proxy 510A may be configured to perform a lookup using the data from the request to identify the proxy 510B which is connected to the connector 508. The proxy 510A may be configured to transmit the message corresponding to the request to the proxy 510B.

The proxy 510B may be configured to receive the message from the proxy 510A. Hence, the proxy 510B which is connected to the connector 508 may be configured to receive messages from other proxies 510A which request a connection to the connector 508 corresponding to the service 506. The proxy 510B may be configured to form, build, construct, compose, or otherwise generate a connection request for the connector 508 responsive to receiving the message from the proxy 510A. The connection request may include information or data similar to the data included in the message. For instance, the connection request may identify the proxy 510A to which the connector 508 is to connect. The connection request may specify a number of data connections which are requested by the proxy 510A. The connection request may include a bandwidth of the connection requested by the proxy 510A. The proxy 510B may extract such information from the message received from the proxy 510A. The proxy 510B may transmit, send, or otherwise provide the connection request to the connector 508. In some embodiments, the proxy 510B may provide the connection request to the connector 508 across the control connection between the proxy 510b and the connector 508.

The proxy 510B may be configured to include, maintain, or otherwise store data corresponding to connections for the connector 508. The proxy 510B may be configured to store data corresponding to the connections in cache 514. The proxy 510B may be configured to update the data to include new connections for the connector 508 as the connector establishes such connections, remove stale, old, expired, or unused connections for the connector 508 as the connector removes such connections, etc. In some embodiments, the data in cache 514 may have a time to live (TTL) which causes the data in cache to expire after a predetermined duration (unless refreshed). Such embodiments may conserve memory for the proxy 510B. The proxy 510B may be configured to automatically purge, delete, expunge, or otherwise remove data from cache 412 following expiration of the TTL. In some embodiments, responsive to generating the message to establish a connection with the connector 508, the proxy 510A may similarly generate a cache entry (e.g., to save in cache 514) to identify that a connection is to be made between the proxy 510A and the connector 508. Similar to other cache data entries, the proxy 510A may generate the cache entry to include a TTL.

In some embodiments, the proxy 510B may be configured to update the data responsive to receiving messages from proxies 510. For instance, when the proxy 510B receives a message from the proxy 510A to requesting establishment of a connection between the connector 508 and the proxy 510A, the proxy 510B may be configured to update the data in cache 514 to indicate the connection between the proxy 510A and the connector 508. In some embodiments, the proxy 510B may be configured to update the data in cache 514 responsive to transmitting a connection request to the connector 508. In some embodiments, the proxy 510B may be configured to update the data in cache 514 responsive to receiving an update from the connector 508 (e.g., which the connector 508 sends to the proxy 510B when the connector 508 establishes and/or removes connections). As such, the proxy 510B may be configured to store data corresponding to an up-to-date list of connections which are maintained by the connector 508. The proxy 510B may be configured to push the data in cache 514 to the connector 508 for re-establishing such connections, as may be needed in various instances, as described in greater detail below.

The connector 508 may be configured to receive the connection request from the proxy 510B. The connector 508 may be configured to receive the connection request across the control connection between the proxy 510B and the connector 508. The connector 508 may be configured to process, analyze, or otherwise parse the connection request to determine with which proxy 510 the connector 508 is to connect. In some embodiments, the connector 508 may be configured to determine whether the connector 508 already shares a control connection with the proxy 510A (e.g., but insufficient data connections for managing the client request). Where the connector 508 does not share a control connection with the proxy 510A, the connector 508 may be configured to establish the control and data connections as requested in the connection request (e.g., from the proxy 510B). The connector 508 may be configured to process, analyze, or otherwise parse the connection request to identify the proxy 510A and the number of data connections which are to be established between the proxy 510A and the connector 508. The connector 508 may be configured to identify the proxy 510A using a port, address, or other identifier corresponding to the proxy 510A included in the connection request. The connector 508 may be configured to identify the number of data connections using the number of data connections specified in the connection request, using the bandwidth specified in the connection request, etc.

The connector 508 may be configured to generate, form, or otherwise establish a connection between the connector 508 and the proxy 510A. The connector 508 may be configured to establish the connection with the proxy 510A responsive to receiving the connection request from the proxy 510B. The connector 508 may be configured to establish the connection with the proxy 510A by performing a handshake with the proxy 510A (e.g., to an address, port, or other identifier indicated in the connection request). The connector 508 may be configured to establish a control connection and a plurality of data connections between the connector 508 and the proxy 510A. The control connection may be used by the proxy 510A and/or connector 508 for controlling the data connections (e.g., the number of data connections, establishing further data connections, removing data connections, etc.) between the connector 508 and the proxy 510A. The data connections may be used for transferring service-related data between the clients 502 and server 504. Hence, the data connections may be a part of the end-to-end connection between the server 504 hosting the service 506 and the clients 502, whereas the control connection may be separate from the end-to-end connection. The control connections may be used for exchanging data between the proxy 510A and connector 508, whereas the data connections may be used for exchanging data between the client 502 and the server 504.

The connector 508 may be configured to maintain the connections between the connector 508 and the proxy 510A as well as the connections between the connector 508 and the proxy 510B. The connections may be used for subsequent client requests to access the service 506 through each of the proxies 510A, 510B. Hence, where a first client sends a request to access a service via a proxy 510 which does not have a connection with the connector 508, the proxy 510 may cause (e.g., by generating a message for proxy 510B, which generates a connection request) the connector 508 to establish the connection. The first client 502 and subsequent clients 502 may use the established connection between the proxy 510 and connector 508 for exchanging service-related data with the service 506. Rather than establishing a connection at each instance (which may increase latency for clients to access a service 506), the connector 508 may maintain a control connection between those corresponding proxies 510 to increase a speed at which the clients associated with the proxy 510 can access the service 506.

As shown in FIG. 5, in some embodiments, the data connections may include buffering connections. The connector 508 may be configured to establish buffering connections to manage overflow traffic between the connector 508 and the proxy 510A, 510B. The buffering connections may be substantially the same as the data connections. In other words, some data connections may be used for managing client requests for the service 506, and some data connections may be held as a buffer for managing overflow client requests. The connector 508 may be configured to establish the buffering connections with the initial data connections between the connector 508 and proxy 510A, 510B.

In some embodiments, the connector 508 may be configured to receive buffer requests from the proxy 510A, 510B. The proxy 510A, 510B may be configured to generate and transmit the buffer requests responsive to detected or anticipated traffic changes (e.g., such as increases or decreases in client requests to access a service 506 corresponding to the connector 508, where the current number of buffering connections is exhausted by client requests, etc.). The proxy 510A, 510B may be configured to transmit the buffer request to the connector 508 across or via the control connection. The connector 508 may establish further buffering connections, remove buffering connections, etc. based on the buffer request. In some embodiments, the connector 508 may be configured to terminate, end, or otherwise remove connections where no traffic is exchanged between the connector 508 and a particular proxy 510 (e.g., to preserve or manage connector 508 overhead or bandwidth). For instance, the connector 508 may remove connections where there is no traffic exchanged after a predetermined duration. When connections are removed by the connector 508 and, subsequently, a client 502 requests access to the service 506 via a proxy 510 in which a connection was removed, the proxy 510 may request establishing a connection as described above.

In some embodiments, the connector 508 may be configured to monitor network traffic between the proxies 510A, 510B. The connector 508 may be configured to monitor a number of requests received from proxies 510A, 510B, a number of packets sent or received by the connector 508 to a respective proxy 510A, 510B, etc. The connector 508 may be configured to use the monitored network traffic to determine the number of buffering connections (and/or data connections) between the connector 508 and proxies 510A, 510B. For instance, as network traffic increases, the connector 508 may be configured to automatically increase the number of data connections and/or buffering connections. Similarly, as the network traffic decreases, the connector 508 may be configured to automatically decrease the number of data connections and/or buffering connections. In some instances, such as where the network traffic between the connector 508 and a proxy 510 decreases to zero, the connector 508 may be configured to decrease the number of data connections and/or buffering connections to zero such that only a control connection is maintained between the connector 508 and the corresponding proxy 510. As network traffic is increased, the proxy 510 may trigger establishment (e.g., by generating and transmitting a buffer request via the control connection) of buffering and data connections by the connector 508.

In some embodiments, where a proxy 510 is inaccessible (e.g., the proxy 510 restarts, loses connection to the network, or other types of events), the clients 502 and connector 508 may automatically establish or form connections with the next-nearest active proxy 510. For the connector 508, none of its existing connections (except for the connection with the proxy 510 that is inaccessible) are affected. Rather, all other connections are maintained by the connector 508. As the proxy 510 maintains data corresponding to active connections in cache 514, when the proxy 510 returns to an active state, the clients 502 and/or connector 508 may automatically re-connect with the proxy 510. Similarly, where the connector 508 detects an event (e.g., a shutdown, a restart, etc.) corresponding to the connector 508, the connector 508 may automatically retrieve data (corresponding to the connections maintained by the connector 508) from cache 514 of the proxy 510B. The connector 508 may automatically re-establish the connections between the connector 508 and the proxies 510. Hence, limited to no interruptions may occur where events corresponding to the proxies 510 and/or connector 508 occur.

Figure 6:
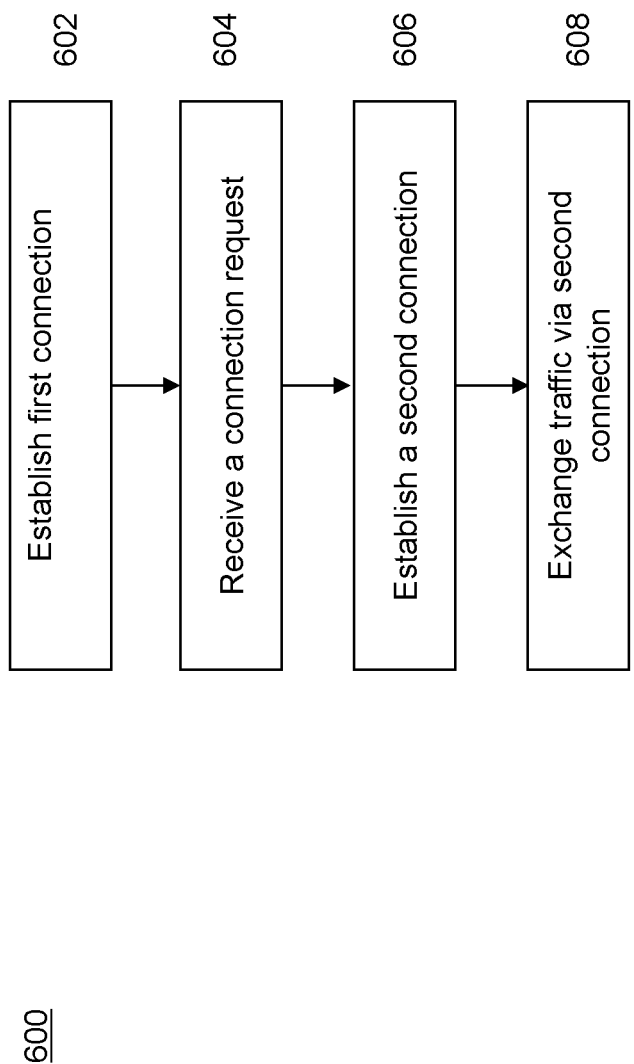
FIG. 6 is a flow diagram of a method for reducing connection setup latency, in accordance with an illustrative embodiment.

Referring now to FIG. 6, depicted is a flowchart showing a method 600 of routing client requests, according to an illustrative embodiment. The method 600 (including various steps included therein) may be implemented by one or more of the components shown in FIG. 5 and described above, such as the clients 502, the connector 508, and/or the proxies 510. As a brief overview, at step 602, a connector establishes a first connection. At step 604, the connector receives a connection request. At step 606, the connector establishes a second connection. At step 608, the connector exchanges traffic via the second connection.

At step 602, and in some embodiments, a connector establishes a first connection. In some embodiments, the connector establishes the first connection with a first proxy. The connector may be configured to connect a server hosting a service to a network. The first proxy may be located at a first point of presence (PoP) of the network. In some embodiments, the network may be a cloud-based network formed by the proxies. The connector may be one of a plurality of connectors which connect various servers hosting respective service(s) to the cloud-based network. The connectors may provide a bridge by which an end-to-end connection is formed between clients and the services hosted on servers. The connector may establish the first connection responsive to the connector being installed to couple the server hosting the service to the network.

The connector may establish the first connection by initiating a handshake with the first proxy. The first proxy may respond to the handshake from the connector to confirm the connection between the connector and the first proxy. In some embodiments, the connector may establish a plurality of connections with the first proxy. The connector may establish a control connection and one or more data connections with the first proxy. The control connection may be a connection used for intercommunication between the first proxy and the connector. The data connection(s) may be used for passing, transferring, or otherwise communicating data between a service and a client (e.g., through the connector and the proxy). Thus, the data connection(s) may be used for end-to-end communications.

In some embodiments, the connector may select the first proxy from a plurality of proxies for establishing the first connection. The connector may select the first proxy based on a proximity between the connector and the first proxy. In some embodiments, the connector may periodically (e.g., at various intervals, randomly, etc.) send a ping to a plurality of proxies. Each of the proxies, upon receiving the ping, may generate and send a response to the connector. The connector may select the first proxy based on the first proxy having the fastest response time (e.g., indicating that the first proxy is in closest proximity to the connector). In some instances, such as where the first proxy is inactive, disconnected from the network, restarting, etc., the connector may establish a connection with a different proxy (e.g., an active proxy which is in closest proximity to the connector). When the first proxy restarts, connects to the network, or otherwise changes to an active state, the connector may re-establish a connection with the first proxy.

At step 604, and in some embodiments, the connector receives a connection request. In some embodiments, the connector may receive the connection request from the first proxy (e.g., to which the connector established a connection at step 602). The connection request may be a request to establish a second connection between the connector and a second proxy associated with a plurality of clients. In some embodiments, the second proxy may be located at the first PoP (e.g., the same PoP as the first proxy). In some embodiments, the second proxy may be located at a second PoP (e.g., separate from the PoP of the first proxy). The connection request may include an identifier of the second proxy and data corresponding to a number of data connections to be established. The first proxy may generate the connection request responsive to a first client of the plurality of clients requesting access to the service through the second proxy. The connector may receive the connection request from the first proxy across, on, or via the first connection. In some embodiments, the connector may receive the connector request via a control connection of the first connection.

In some embodiments, the second proxy broadcasts a message to a plurality of proxies including the first proxy. The second proxy may broadcast the message responsive to determining that the second proxy is not connected to the connector. The second proxy may store data corresponding to connections established, held, or otherwise maintained by the second proxy in cache. The second proxy may perform a lookup in cache maintained by the second proxy using information included in the request from the client to determine whether the second proxy is connected to the connector corresponding to the service.

The second proxy may generate a message responsive to determining that the second proxy does not maintain a connection with the connector (e.g., based on the results from the lookup). The message may include information corresponding to the second proxy (e.g., an identifier of the second proxy, an address of the second proxy, an identifier or address of the connector or server hosting the service, etc.). The second proxy may broadcast the message to determine which of the plurality of proxies is connected to the connector corresponding to the service. In some embodiments, the second proxy may perform a global lookup in a database or data structure which includes proxies and corresponding connectors connected thereto to identify the first proxy. The second proxy may perform the global lookup using data from the request to access the service to identify the first proxy. In either embodiment, the second proxy may transmit the message to the first proxy (e.g., either alone or to a plurality of proxies including the first proxy). The first proxy may receive the message (e.g., from the second proxy). The first proxy may parse the message and generate a connection request based on the message from the second proxy. The first proxy may structure the connection request to include, for instance, an identifier of the second proxy (e.g., an address), a number of data connections or bandwidth requested, etc. The connector may receive the connection request from the first proxy responsive to the first proxy receiving the message from the second proxy.

The connector may analyze, inspect, or otherwise parse the connection request to identify the second proxy. The connector may identify an address associated with the second proxy. Such information may be included in the connection request. The connector may identify the second proxy in the connection request for establishing a control connection therewith. Similarly, the connector may parse the connection request to determine a number of data connections to establish between the second proxy and the connector. The connector may parse the connection request responsive to receiving the connection request from the first proxy.

In some embodiments, the first proxy may store data corresponding to connections maintained by the first proxy (similar to the second proxy). In some embodiments, the first proxy may store data corresponding to connections maintained by the connector. The first proxy may store data corresponding to connections maintained by the connector in cache for the first proxy. The first proxy may update the data in cache to indicate new connections as the connector establishes such new connections, to remove data corresponding to connections which are removed by the connector, etc. In some embodiments, the first proxy may update cache to include data corresponding to the second connection responsive to receiving the message from the second proxy. The first proxy may update the cache when the first proxy receives the message from the second proxy. The first proxy may update the cache when the first proxy receives an update from the connector (e.g., following the connector establishing the second connection, as described in greater detail below).

At step 606, and in some embodiments, the connector establishes a second connection. In some embodiments, the connector may establish the second connection between the connector and the second proxy. The connector may establish the second connection to facilitate exchange of traffic between the plurality of clients and the service. Similar to establishing the first connection described above at step 602, in some embodiments, the connector may establish the second connection by initiating a handshake with the second proxy. The second proxy may respond to the handshake from the connector to confirm the connection between the connector and the second proxy. In some embodiments, the connector may establish a plurality of connections with the second proxy. The connector may establish a control connection and one or more data connections with the second proxy. The control connection may be a connection used for intercommunication between the first proxy and the connector. The data connection(s) may be used for passing, transferring, or otherwise communicating data between a service and a client (e.g., through the connector and the proxy). Thus, the data connection(s) may be used for end-to-end communications. In some embodiments, at least one of the data connections may be a buffering connection across which overflow traffic is exchanged between the plurality of clients and the service. The buffering connections may be substantially the same as the data connections. The data connections may be used by clients for exchanging data between the clients and server hosting the service. On the other hand, the buffering connections may handle overflow traffic as further client requests are received by the second proxy.

At step 608, and in some embodiments, the connector exchanges traffic via the second connection. The connector may exchange traffic between the first client and the server hosting the service via the second connection. In some embodiments, the connector may exchange traffic between the server hosting the service and a second client of the plurality of clients via the second connection. Hence, the connector may maintain the second connection between the second proxy and the connector. The second proxy may receive a second request from the second client to access the service, and the connector may exchange data corresponding to the service between the second client and the service via the second connection.

In some embodiments, the connector may receive a buffer request from the second proxy. While described with reference to the second proxy, it is noted that the connector may similarly receive a buffer request from the first proxy. The buffer request may be a request to add one or more additional buffering connections between the second proxy and the connector, may be a request to remove a buffering connection between the second proxy and the connector, etc. The second proxy may generate the buffer request based on expected conditions of traffic between the service and the plurality of clients. For instance, the second proxy may generate a buffer request to add additional buffering connection(s) based on an expected increase in traffic between the plurality of clients and the service. Similarly, the second proxy may generate a buffer request to remove a buffering connection based on an expected decrease in traffic between the plurality of clients and the service. The connector may receive the buffering request from the second proxy (e.g., via a control connection of the second connection). The connector may establish further buffering connection(s), remove buffering connection(s) responsive to the buffer request. In some embodiments, the connector may monitor traffic between the connector and the second proxy. The connector may determine an expected decrease in traffic between the clients and the service, may determine current traffic conditions show a decrease in traffic (e.g., from a previous amount of traffic such as a decrease to no traffic). The connector may automatically remove one or more buffering connections between the second proxy and the connector (e.g., rather than the connector removing one or more buffering connections responsive to the connector receiving a buffer request from the second proxy). Such implementations may manage bandwidth between the connector and second proxy, while ensuring sufficient connections for managing the traffic and reducing latency.

In some embodiments, the connector may detect an event corresponding to the connector. The event may be a shutdown event, a restart event, an interruption event, a loss of connectivity event, etc. The event may cause a loss of connections between the connector and the proxies (e.g., the first and second proxies). The connector may retrieve data corresponding to the connections from cache of the first proxy responsive to detecting the event. The connector may re-establish the connections (e.g., the first connection and the second connection). Such implementations may limit latency for clients by eliminating a client having to request re-establishing the connection upon requesting access to the service. Rather, when the connector detects the event, the connector preemptively re-establishes the connections. As such, clients may use already-established connections for network traffic between the client and service.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

I claim:

1. A method comprising:
   establishing, by a connector configured to connect a server hosting a service to a network, a first connection between the connector and a server-side proxy of a first point of presence (PoP) of the network, the connector separate from the server-side proxy;
   receiving, by the connector, from the server-side proxy responsive to the server-side proxy receiving a message from a client-side proxy of a second PoP, a connection request to establish a second connection between the connector and the client-side proxy associated with a plurality of clients, the client-side proxy configured to transmit the message to the server-side proxy responsive to a first client of the plurality of clients requesting access to the service through the client-side proxy; and
   establishing, by the connector, the second connection between the connector and the client-side proxy responsive to receiving the connection request from the server-side proxy, to facilitate exchange of traffic between the plurality of clients and the service across the network via the second connection.

2. The method of claim 1, further comprising:
   causing, by the connector, data corresponding to connections between the connector and a plurality of proxies including the server-side proxy and the client-side proxy to be stored in cache for the server-side proxy;
   detecting, by the connector, an event corresponding to the connector; and
   retrieving, by the connector from cache of the server-side proxy, the data corresponding to the connections, to re-establish the connections including the first connection and the second connection.

3. The method of claim 1, further comprising selecting, by the connector from a plurality of proxies, the server-side proxy to establish the first connection based on a proximity between the connector and the server-side proxy.

4. The method of claim 1, wherein establishing the second connection comprises establishing, by the connector, a plurality of second connections between the connector and the client-side proxy, at least one of the plurality of connections being a buffering connection across which overflow traffic is exchanged between the plurality of clients and the service.

5. The method of claim 4, further comprising:
   receiving, by the connector from the client-side proxy, a buffer request to add one or more additional buffering connections between the client-side proxy and the connector based on an expected increase in traffic between the plurality of clients and the service; and
   establishing, by the connector, at least one buffering connection between the client-side proxy and the connector responsive to the buffer request.

6. The method of claim 4, further comprising:
   removing, by the connector, the buffering connection between the client-side proxy and the connector, to manage bandwidth for the connector.

7. The method of claim 1, wherein the client-side proxy broadcasts the message to a plurality of proxies including the server-side proxy, to determine which of the plurality of proxies is connected to the connector corresponding to the service.

8. The method of claim 7, wherein the server-side proxy is configured to update cache to include data corresponding to the second connection responsive to receiving the message from the client-side proxy.

9. The method of claim 1, further comprising:
maintaining, by the connector, the second connection between the client-side proxy and the connector; and
responsive to the client-side proxy receiving a second request from a second client of the plurality of clients, exchanging, by the connector, data corresponding to the service between the second client and the service via the second connection.

10. The method of claim 1, further comprising:
monitoring, by the connector, network traffic between the connector and at least one of the server-side proxy or the client-side proxy; and
maintaining, by the connector, a number of connections between the connector and the at least one of the server-side proxy or the client-side proxy based on the monitored network traffic.

11. A system comprising:
a connector executing on at least one processor and configured to connect a server hosting a service to a network, the connector configured to:
establish a first connection between the connector and a server-side proxy of a first point of presence (PoP) of the network, the connector separate from the server-side proxy;
receive, from the server-side proxy responsive to the server-side proxy receiving a message from a client-side proxy of a second PoP, a connection request to establish a second connection between the connector and the client-side proxy associated with a plurality of clients, the client-side proxy configured to transmit the message to the server-side proxy responsive to a first client of the plurality of clients requesting access to the service through the client-side proxy; and
establish the second connection between the connector and the client-side proxy responsive to receiving the connection request from the server-side proxy, to facilitate exchange of traffic between the plurality of clients and the service across the network via the second connection.

12. The system of claim 11, wherein the connector is further configured to cause data corresponding to connections between the connector and a plurality of proxies including the server-side proxy and the client-side proxy to be stored in cache for the server-side proxy.

13. The system of claim 12, wherein the connector is further configured to:
detect an event corresponding to the connector; and
retrieve, from cache of the server-side proxy, the data corresponding to the connections, to re-establish the connections including the first connection and the second connection.

14. The system of claim 11, wherein the connector is further configured to select, from a plurality of proxies, the server-side proxy to establish the first connection based on a proximity between the connector and the server-side proxy.

15. The system of claim 11, wherein the connector is configured to establish a plurality of second connections between the connector and the client-side proxy, at least one of the plurality of connections being a buffering connection across which overflow traffic is exchanged between the plurality of clients and service.

16. The system of claim 15, wherein the connector is configured to:
receive, from the client-side proxy, a buffer request to add one or more additional buffering connections between the client-side proxy and the connector based on an expected increase in traffic between the plurality of clients and the service; and
establish at least one buffering connection between the client-side proxy and the connector responsive to the buffer request.

17. The system of claim 15, wherein the connector is configured to:
remove the buffering connection between the client-side proxy and the connector, to manage bandwidth for the connector.

18. The system of claim 11, wherein the client-side proxy broadcasts the message to a plurality of proxies including the server-side proxy, to determine which of the plurality of proxies is connected to the connector corresponding to the service.

19. The system of claim 11, wherein the connector is further configured to:
maintain the second connection between the client-side proxy and the connector; and
responsive to the client-side proxy receiving a second request from a second client of the plurality of clients, exchange data corresponding to the service between the second client and the service via the second connection.

20. A non-transitory computer readable medium storing program instructions for causing one or more processors to:
establish a first connection between a connector and a server-side proxy of a first point of presence (PoP) of a network, the connector configured to connect a server hosting a service to the network, the connector separate from the server-side proxy;
receive, from the server-side proxy responsive to the server-side proxy receiving a message from a client-side proxy of a second PoP, a connection request to establish a second connection between the connector and the client-side proxy of the network associated with a plurality of clients, the client-side proxy configured to transmit the message to the server-side proxy responsive to a first client of the plurality of clients requesting access to the service through the client-side proxy; and
establish the second connection between the connector and the client-side proxy responsive to receiving the connection request from the server-side proxy, to facilitate exchange of traffic between the plurality of clients and the service across the network via the second connection.

* * * * *